(12) United States Patent
Hamad et al.

(10) Patent No.: US 12,004,666 B2
(45) Date of Patent: Jun. 11, 2024

(54) KNIFE STATION WITH SPEECH RECOGNITION

(71) Applicant: Haier US Appliance Solutions, Inc., Wilmington, DE (US)

(72) Inventors: Abdel Hamad, Louisville, KY (US); Srikanth Raavi Venkata, Louisville, KY (US); Nabil Alhaffar, Evansville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 890 days.

(21) Appl. No.: 17/022,430

(22) Filed: Sep. 16, 2020

(65) Prior Publication Data
US 2022/0084528 A1   Mar. 17, 2022

(51) Int. Cl.
| | | |
|---|---|---|
| *A47G 21/14* | (2006.01) | |
| *B26B 9/00* | (2006.01) | |
| *E05B 51/00* | (2006.01) | |
| *E05B 73/00* | (2006.01) | |
| *G06F 3/16* | (2006.01) | |
| *G07C 9/00* | (2020.01) | |
| *G07C 9/37* | (2020.01) | |
| *G10L 17/22* | (2013.01) | |
| *G10L 25/63* | (2013.01) | |

(52) U.S. Cl.
CPC ............... *A47G 21/14* (2013.01); *B26B 9/00* (2013.01); *E05B 51/00* (2013.01); *E05B 73/00* (2013.01); *G06F 3/167* (2013.01); *G07C 9/00563* (2013.01); *G07C 9/37* (2020.01); *G10L 17/22* (2013.01); *G10L 25/63* (2013.01)

(58) Field of Classification Search
None
See application file for complete search history.

(56) References Cited

U.S. PATENT DOCUMENTS

| | | | | |
|---|---|---|---|---|
| 5,245,756 | A | * 9/1993 | Howell | A47G 21/14 30/151 |
| 7,228,632 | B2 | 6/2007 | Brian | |
| 9,237,815 | B2 | 1/2016 | Smith | |
| 2011/0084177 | A1* | 4/2011 | Curwen | A47G 21/14 248/37.3 |
| 2011/0166694 | A1 | 7/2011 | Griffits | |
| 2011/0289124 | A1* | 11/2011 | Denison | G07F 5/26 707/812 |
| 2013/0306500 | A1 | 11/2013 | Barber | |
| 2018/0000268 | A1* | 1/2018 | Zhijian | G07C 9/00563 |
| 2018/0247065 | A1* | 8/2018 | Rhee | G06F 21/32 |
| 2021/0244216 | A1* | 8/2021 | Kelly | G07C 9/37 |

* cited by examiner

*Primary Examiner* — Jennifer S Matthews
(74) *Attorney, Agent, or Firm* — Dority & Manning, P.A.

(57) ABSTRACT

A knife station includes a knife block defining a plurality of slots for receiving a plurality of cutlery objects. A locking assembly selectively locks the cutlery objects in their respective slot, e.g., using a locking pin that passes through an aperture in the blade. A controller is operably coupled to an audio device, such as a microphone, for receiving voice commands. The voice commands are converted to text commands using AI-based speech recognition technology and the text commands are compared to a database of text commands to identify a target cutlery object from the cutlery objects in the knife block. The controller may then illuminate a light emitting diode next to the target cutlery and unlock only that piece of cutlery so that the user may withdraw it from the knife block.

20 Claims, 5 Drawing Sheets

KNIFE STATION WITH SPEECH RECOGNITION

FIELD OF THE INVENTION

The present subject matter relates generally to knife stations, or more specifically, to intelligent knife stations that unlock or recommend a particular cutlery object in response to voice input from the user.

BACKGROUND OF THE INVENTION

Knife stations or knife block sets are typically passive systems that include a knife block and knives of various sizes. The knife block defines slots for receiving the various knifes, blade end first, for safe keeping when not in use. When a user desires to use a particular knife, the user simply pulls on the handle of the knife to slide the knife out of the block.

However, there are several downsides to conventional knife stations. For example, from a perspective of user safety, knife users commonly injure themselves by using the incorrect knife for the job. Even if the user knows which knife is needed, insufficient knife identification or improper storage may result in a user unwittingly taking an improper knife for the food product they are cutting, resulting in injury. Moreover, conventional knife stations have no way of knowing whether an unauthorized user (e.g., a child) is attempting to withdraw a knife. In addition to safety concerns, selecting the wrong knife may reduce the culinary experience, as each knife is typically designed for one or more specific purposes. In this regard, for example, using a chef's knife to cut a loaf bread would likely result in a smashed, compressed interior of the loaf, whereas an elongated, serrated knife might be particularly suitable for this purpose.

Accordingly, a knife station that includes intelligent features and operation would be desirable. More specifically, a knife station that uses speech recognition to identify the user and their needs for a particular knife, and which securely and safely provides that knife for use would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a knife station is provided including a knife block defining a plurality of slots and a plurality of cutlery objects, each of the plurality of cutlery objects being configured for receipt within one of the plurality of slots. A locking assembly is provided for selectively locking one or more of the plurality of cutlery objects within the plurality of slots and a controller is operably coupled to the locking assembly. The controller being configured to receive a voice command from a user, identify a target cutlery object from the plurality of cutlery objects based at least in part on the voice command, and unlock the target cutlery object so that the user may remove it from the knife block.

In another exemplary embodiment, a method of operating a knife station is provided. The knife station includes a knife block defining a plurality of slots for receiving a plurality of cutlery objects and a locking assembly for selectively locking one or more of the plurality of cutlery objects within the plurality of slots. The method includes receiving a voice command from a user, identifying a target cutlery object from the plurality of cutlery objects based at least in part on the voice command, and unlocking the target cutlery object so that the user may remove it from the knife block.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
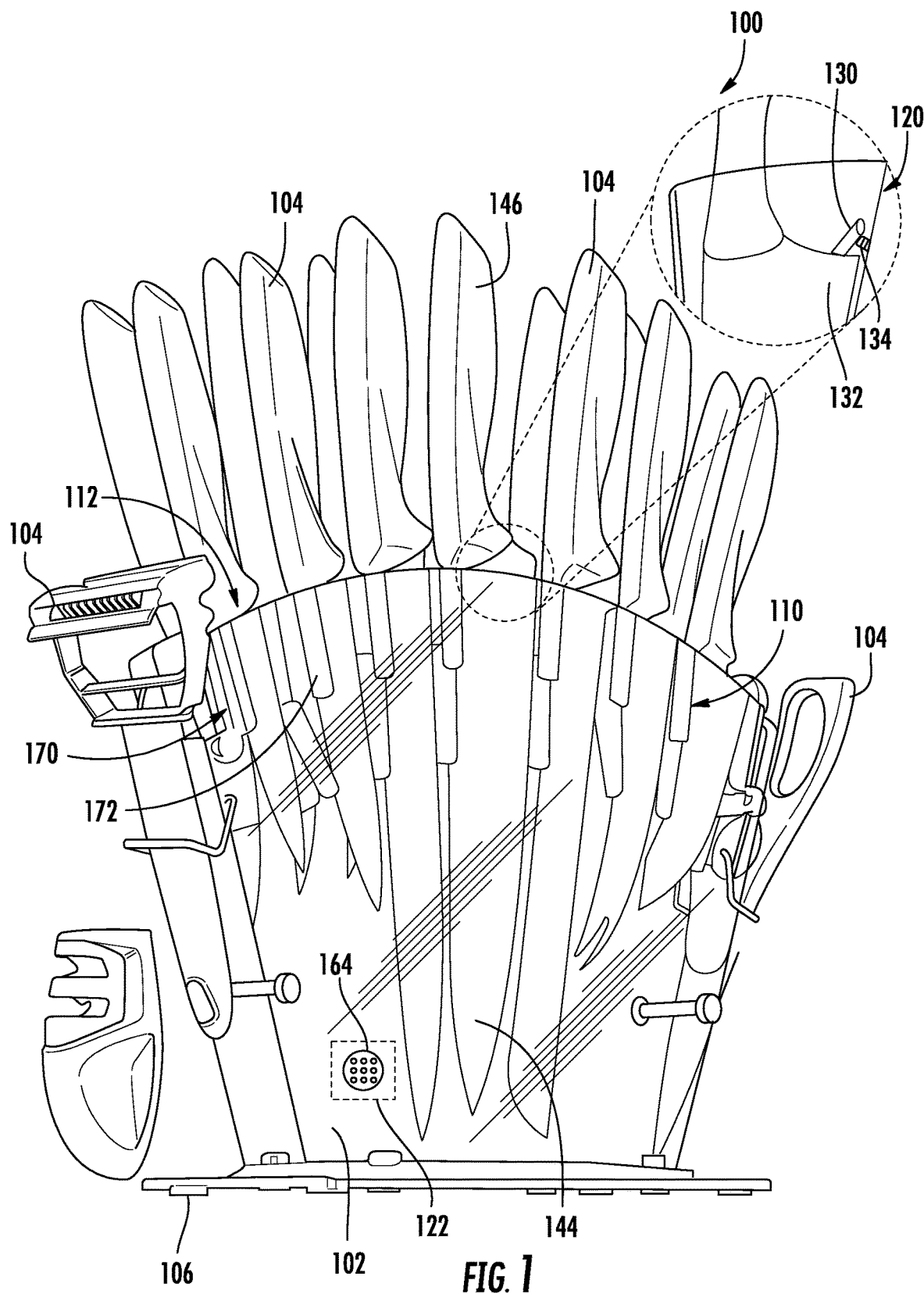
FIG. 1 provides a perspective view of a knife station according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Referring now to the figures, FIG. 1 is a perspective view of a knife station 100 according to an exemplary embodiment of the present subject matter. Knife station 100 may be used in a variety of contexts, locations, and applications. For example, knife station 100 may be positioned on a kitchen counter of a residential kitchen or may be used in a commercial kitchen setting. According to the illustrated embodiment, knife station 100 includes a knife block 102 that is generally configured for receiving and storing a plurality of cutlery objects 104. As used herein, the term "cutlery objects" is generally intended to refer to any knife, utensil, shears, clippers, or other implement that may be used in a kitchen or culinary setting. For example, as illustrated in FIG. 1, cutlery objects 104 include various types of knives (e.g., Chef's knife, Santoku knife, utility knife, serrated utility knife, bread knife, paring knife, boning knife, etc.) as well as other commonly used kitchen cutlery (e.g., such as graters, kitchen shears, knife sharpeners, etc.). Although exemplary cutlery is illustrated herein for the purpose of explaining aspects of the present subject matter, it should be appreciated that according to alternative embodiments any other suitable kitchen cutlery or implements may be used.

Figure 3:
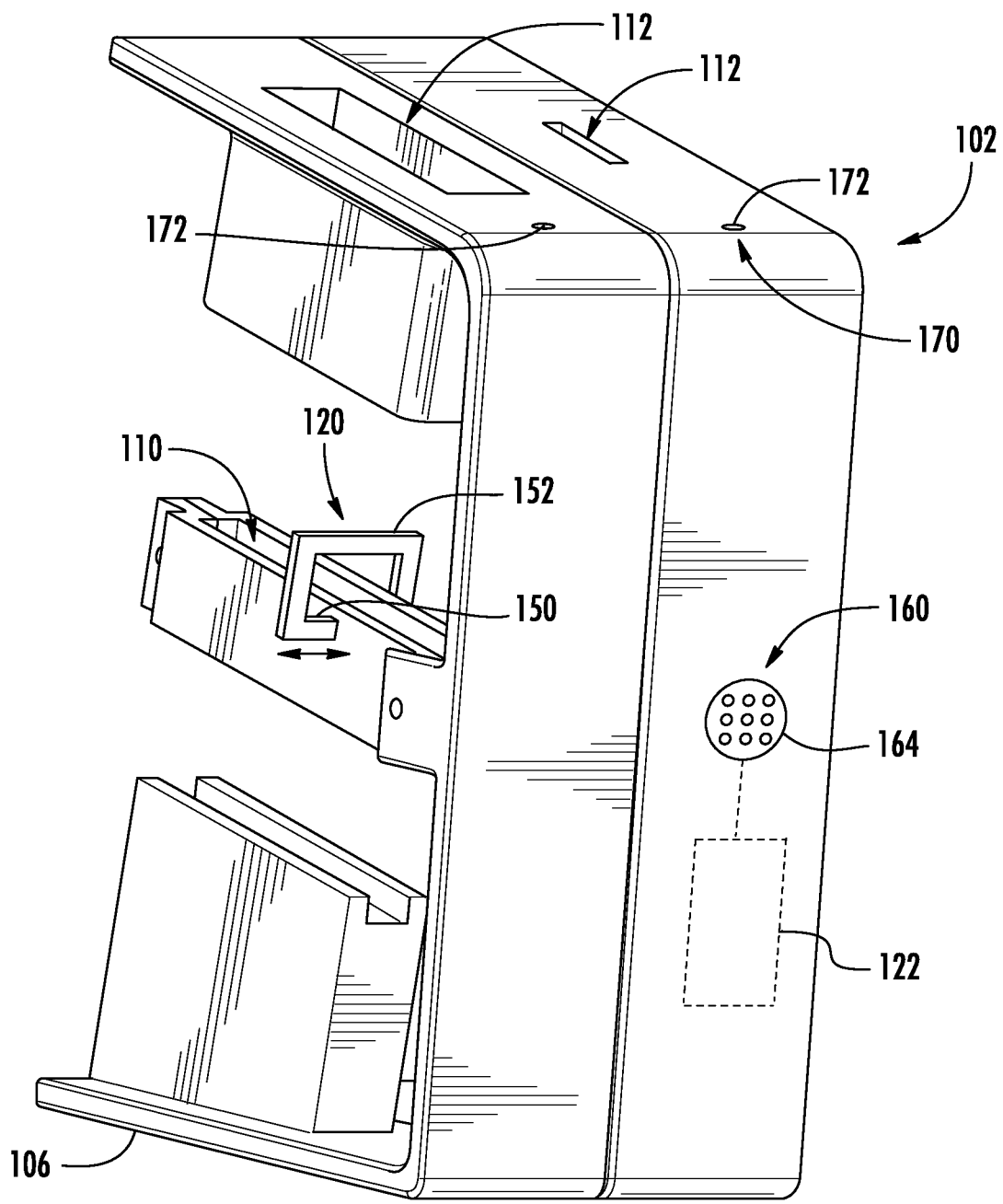
FIG. 3 provides a perspective view of a knife station according to another exemplary embodiment of the present subject matter.
Figure 4:
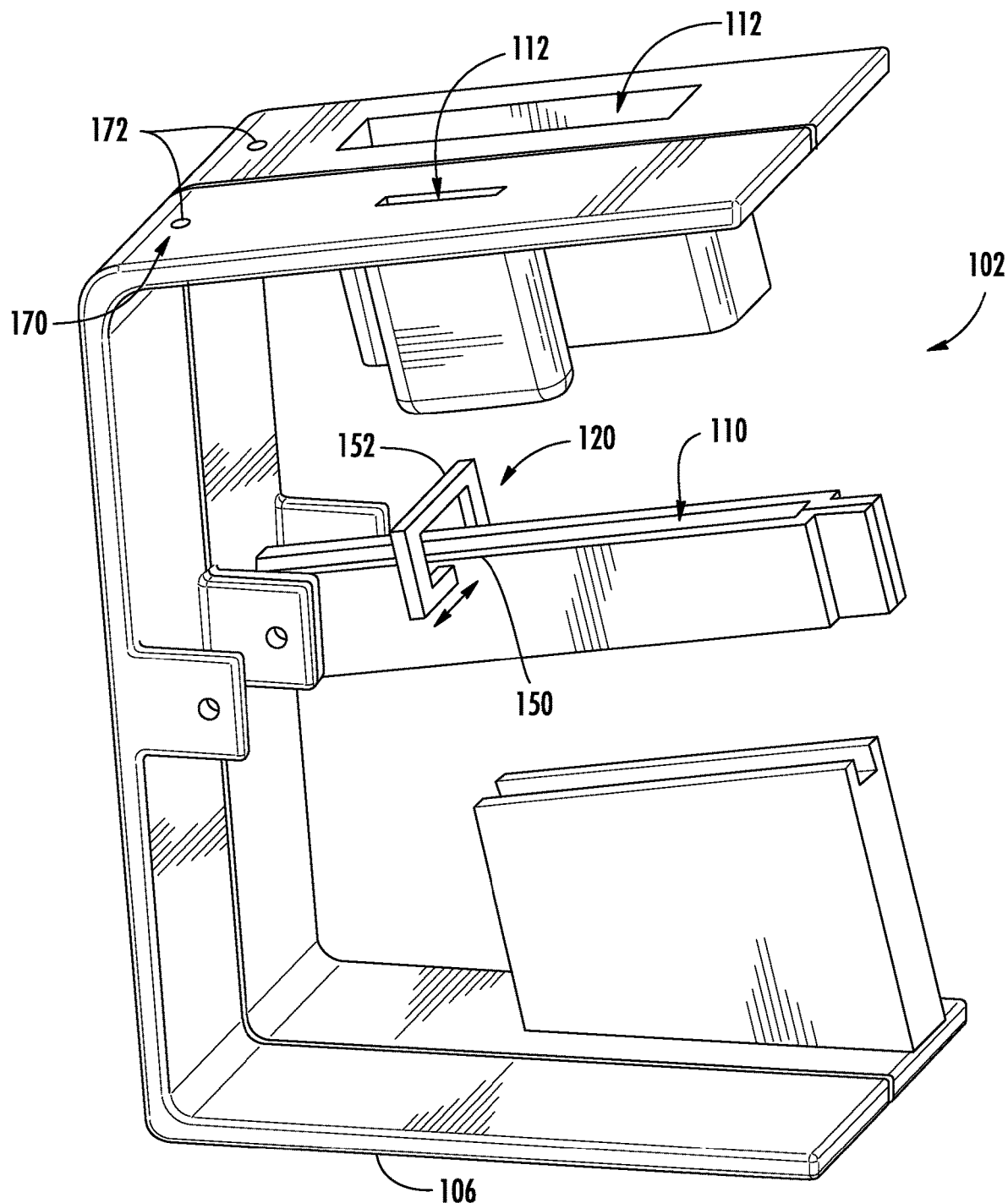
FIG. 4 provides another perspective view of the exemplary knife station of FIG. 3 according to an exemplary embodiment of the present subject matter.

Knife block 102 may generally be formed from any suitably rigid structure is capable of receiving and securing cutlery objects 104. For example, according to the embodiment illustrated in FIG. 1, knife block 102 is formed from a clear glass or plexiglass material, whereas the embodiment illustrated in FIGS. 3 and 4 is formed from a molded plastic. It should be appreciated that according to other embodiments, knife block 102 may be formed from a large block of wood or any other suitable material. Knife block 102 may include slip resistant feet or padding 106 to prevent knife block 102 from sliding on the countertop or any other surface where it is stationed.

Knife block 102 generally defines a plurality of apertures, openings, or slots 110 that are generally configured for receiving cutlery objects 104. Specifically, these slots are commonly oriented substantially along the vertical direction or inclined relative to the horizontal direction with a top opening 112 such that a user 114 may slide cutlery objects 104 into slots 110 such that they are retained at least in part under the force of gravity. According to an exemplary embodiment, each slot 110 is sized and designed to store a particular cutlery object 104. However, it should be appreciated that according to alternative embodiments, slots 110 may designed to receive more than one size or type of cutlery object 104 and knife station 100 may include other means for determining which cutlery objects 104 are stored within a particular slot 110.

Figure 2:
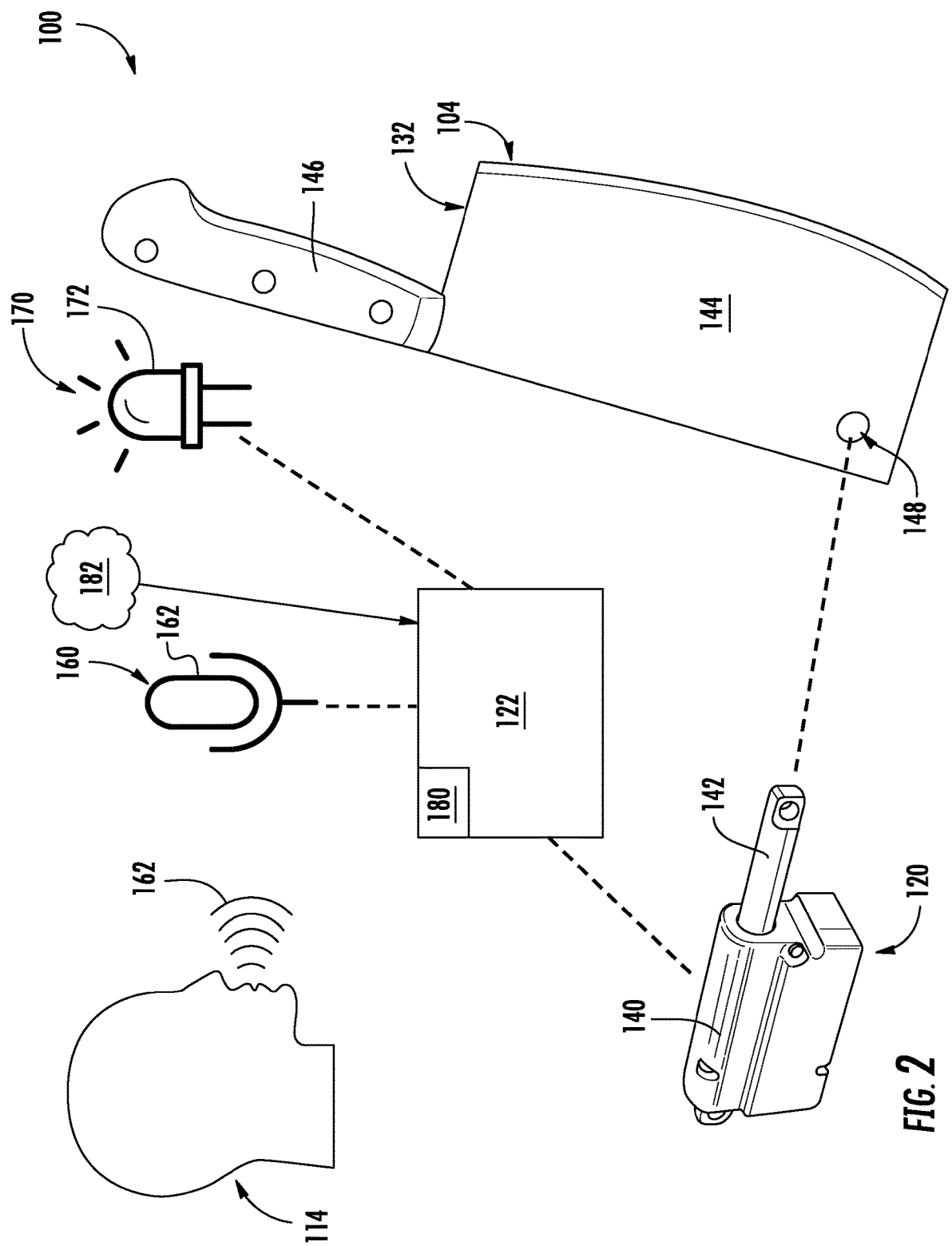
FIG. 2 provides a schematic view of an exemplary locking assembly that may be used with the exemplary knife station of FIG. 1.

Referring now also to FIGS. 2 through 4, knife station 100 may further include a locking assembly 120 which is mounted onto or within knife block 102 for selectively locking one or more of cutlery objects 104 within the plurality of slots 110. For reasons explained in more detail below, locking assembly 120 may be in operative communication with a controller 122 of knife station 100. In this regard, controller 122 may be positioned within or on knife block 102 and may be operably coupled to the locking assembly 120 for regulating operation of locking assembly 120, as described in more detail below.

Controller 122 may include a memory and microprocessor, such as a general or special purpose microprocessor operable to execute programming instructions or microcontrol code associated with operating one or more components of knife station 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 122 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Locking assembly 120 and other components of knife station 100 may be in communication with controller 122 via one or more signal lines or shared communication busses.

Referring generally to FIGS. 1 through 4, exemplary locking assemblies 120 will now be described. It should be appreciated that the various locking assemblies 120 described herein are only intended to help facilitate explanation of aspects of the present subject matter. Other suitable devices and systems for locking cutlery objects 104 within knife block 102 are possible and within the scope of the present subject matter. The locking assemblies 120 described are not intended to limit the scope of the subject matter in any manner.

Referring specifically to FIG. 1, locking assembly 120 may include a plurality of locking arms 130 positioned proximate openings 112 of each of slots 110. Locking arms 130 may generally be configured for sliding, rotating, or pivoting toward culinary objects 104 positioned within the respective slots 110 to prevent them from being withdrawn when locking arm 130 is in the locked position. For example, locking arm 130 may pivot into engagement with a notch, a slot, or the bolster 132 of each culinary object 104 when the culinary object 104 is inserted through slot 110. As explained in more detail below, controller 122 may be operably coupled to a pivoting actuator 134 that regulates the position of locking arm 130. In this manner, controller 122 may selectively release one or more cutlery objects 104, e.g., depending on the needs or requests of user 114.

Referring now specifically to FIG. 2, another exemplary locking assembly 120 will be described according to an exemplary embodiment of the present subject matter. Specifically, as illustrated, locking assembly 120 includes a plurality of linear actuators 140. According to exemplary embodiment, each of the plurality of linear actuators 140 are associated with one of the plurality of slots 110. However, it should be appreciated that according to alternative embodiments, fewer linear actuators 140 than cutlery objects 104 may be used while remaining within the scope of the present subject matter. In general, linear actuators 140 are in operative communication with controller 122 and include a locking pin 142 that moves between a retracted position (e.g., where associated cutlery object 104 is free to slide into and out of slot 110) and an extended position (e.g., where cutlery object 104 is locked within slot 110). It should be appreciated that locking pin 142 may engage cutlery objects 104 in any suitable manner, such as by the locking against bolster 132, the blade 144, and/or the handle 146. According to the illustrated exemplary embodiment, each cutlery object 104 may define an aperture 148 (e.g., as illustrated in the blade 144) through which locking pin 142 may pass when in the extended/locked position each of the plurality of linear actuators 140 may be independently controlled, such that controller 122 may selectively lock and/or unlock each of cutlery objects 104 within their respective slots 110.

According to still other embodiments, such as illustrated in FIGS. 3 and 4, locking assembly 120 may include one or more clamping members 150 that are associated with each of the plurality of slots 110. Each clamping member 150 may be operably coupled with an actuating mechanism 152 for selectively squeezing clamping members 150 to secure cutlery objects 104, e.g., via frictional force. It should be appreciated that any suitable number, type, configuration, and position of actuators may be used while remaining within the scope of the present subject matter. In addition, locking assembly 120 may take other forms, include other components, and may engage cutlery objects 104 and any other suitable manner.

As illustrated schematically in FIG. 2, knife station 100 may further include an audio input device 160 that is generally configured for receiving voice commands (e.g., as identified schematically by reference numeral 162). In general, audio input device 160 may be any suitable device or devices mounted on, within, or near knife station 100 for receiving audio inputs from user 114 of knife station 100 for example, according to an exemplary embodiment, audio input device 160 may be a microphone 164 mounted on a front of knife block 102. Other suitable audio input devices are possible and within the scope of the present subject matter.

Referring still to FIGS. 1 through 4, knife station 100 may further include an indicator system 170 that is generally configured for selectively identifying one or more of the plurality of cutlery objects 104 within knife block 102. As illustrated, indicator system 170 may include a plurality of light sources 172, each of which may be associated with one or more slots 110 of knife block 102. In this manner, when knife station 100 wishes to indicate a particular cutlery object 104 for use, a light source 172 positioned adjacent the associated slot 110 may be illuminated to inform user 114 of the desired cutlery object 104. For example, if controller 122 determines that the chef's knife is the preferred cutlery object 104, controller 122 may illuminate a light source 172 that is positioned proximate or adjacent to the chef's knife.

Light sources 172 may be provided as any suitable number, type, position, and configuration of electrical light source(s), using any suitable light technology and illuminating in any suitable color. For example, according to the illustrated embodiment, light sources 172 include one or more light emitting diodes (LEDs), which may each illuminate in a single color (e.g., white LEDs), or which may each illuminate in multiple colors (e.g., multi-color or RGB LEDs) depending on the control signal from controller 122. However, it should be appreciated that according to alternative embodiments, light sources 172 may include any other suitable traditional light bulbs or sources, such as halogen bulbs, fluorescent bulbs, incandescent bulbs, glow bars, a fiber light source, etc. In addition, it should be appreciated that indicator system 170 may include one or more displays, numbering systems, liquid crystal display ("LCD") screens, or any other suitable interactive indication system for identifying cutlery objects 104.

Now that the construction of knife station 100 and the configuration of controller 122 according to exemplary embodiments have been presented, an exemplary method 200 of operating a knife station will be described. Although the discussion below refers to the exemplary method 200 of operating a knife station 100, one skilled in the art will appreciate that the exemplary method 200 is applicable to the operation of a variety of other knife stations having any other suitable configuration, locking mechanisms, indicator systems, etc. In exemplary embodiments, the various method steps as disclosed herein may be performed by controller 122 or a separate, dedicated controller.

Figure 5:
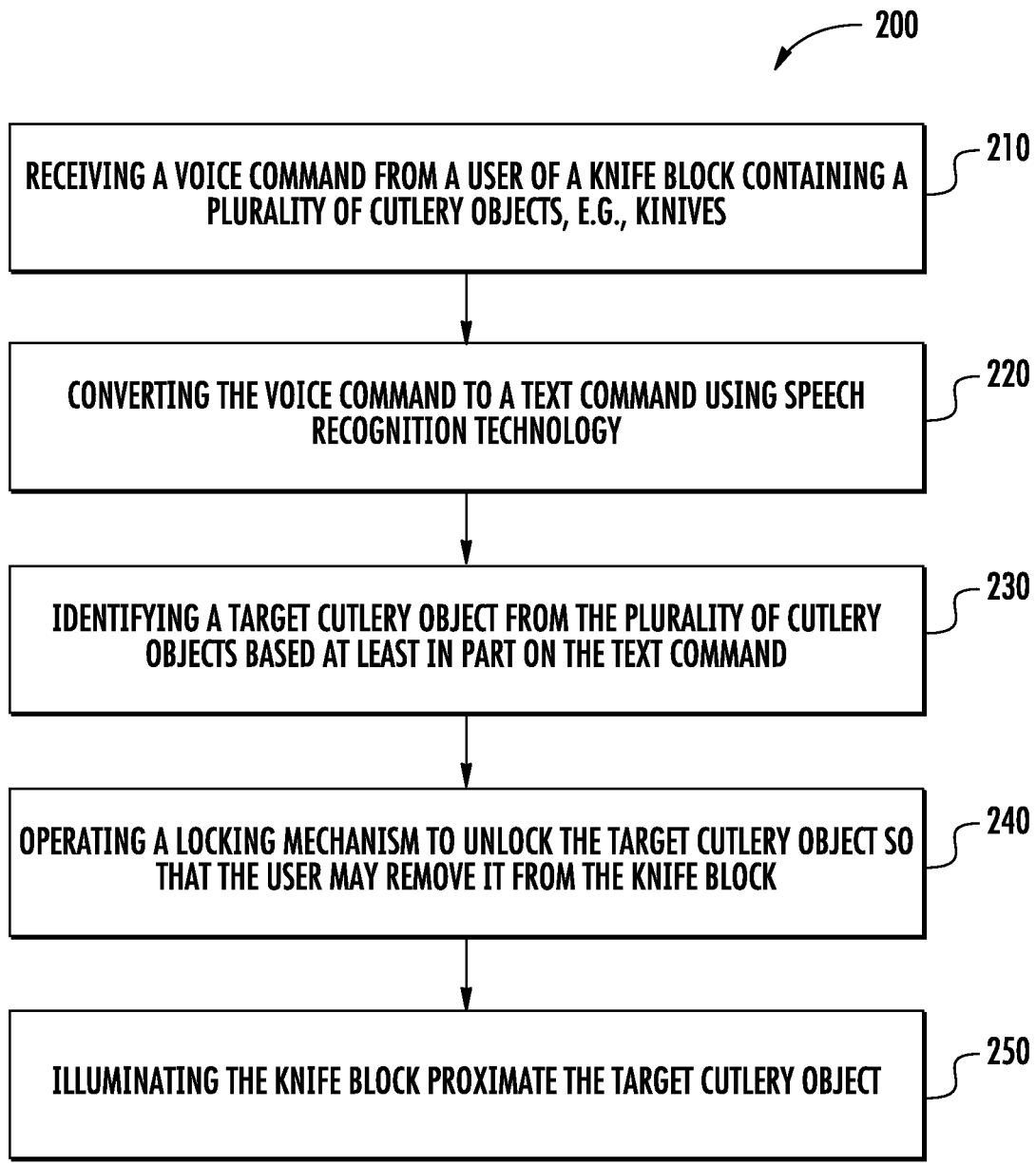
FIG. 5 illustrates a method for operating a knife station in accordance with one embodiment of the present disclosure.

Referring now to FIG. 5, method 200 includes, at step 210, receiving a voice command from a user of the knife station. For example, continuing the example from above, user 114 of knife station 100 may communicate out loud with knife station 100 as to the desired cutlery object 104, as to the cutlery application, or as to any other suitable information that knife station 100 may use to determine the desired or most appropriate cutlery object 104. As used herein, the term "target cutlery object" is intended to refer to that cutlery object 104 which is most appropriate for user's 114 desired application, e.g., based on their voice command 162 or other inputs.

The implementation of knife station 100 interpreting voice command 162 is best illustrated in FIG. 2. As shown, user 114 may state out loud their voice command 162, and controller 122 may unlock a target cutlery object 104 and illuminate a light source 172 adjacent that cutlery object 104 such that a user may be informed of the appropriate or target cutlery object 104 and receive visual indication of the location of the target cutlery object 104. Moreover, the remaining cutlery objects 104 (i.e., those that are not the target cutlery object 104) may remain locked in place by locking assembly 120, such that user 114 will be prevented from removing them from slots 110.

As noted above, voice command 162 may be any audible communication from user 114 is useful in selecting a target cutlery object 104. For example, the voice command 162 may be "slice bread," "serrated knife," "slice cake," "cut sandwich," "dice vegetables," "chop barbeque," "chef's knife," or any other suitable command. According to an exemplary embodiment, voice command 162 may include the type of cut that is to be made (e.g., slice, dice, chop, mince, snip, cut, etc.) and/or the type of food to be cut (e.g., meat, vegetable, tomato, onion, bread, herbs, poultry, etc.).

Method 200 may then include the step of identifying a target cutlery object from the cutlery objects 104 stored in knife block 102 based at least in part on the voice command 162. Specifically, according to an exemplary embodiment, step 220 may include converting the voice command 162 to a text command using a speech recognition technology. As used herein, the term "speech recognition technology" and the like is intended to refer to any suitable device, algorithm, artificial intelligence, or other methods for converting audio input or raw speech into another format, such as textual or other digital data. For example, the speech recognition technology may include any automatic speech recognition ("ASR") systems, natural language processing ("NLP"), or other speech recognition technology. According to exemplary embodiments, this speech recognition technology may use artificial intelligence ("AI"), neural networks, e.g., such as convolutional neural networks ("CNN"), machine learning, or any other suitable technology.

For example, according to an exemplary embodiment, the process of converting voice data or messages to textual data may be performed using artificial intelligence techniques. For example, the data analysis and artificial intelligence process may incorporate methods such as heuristics, support vector machines, neural networks, the Markov decision process, natural language processing, case-based reasoning, rule-based systems, genetic algorithms, fuzzy systems, multi-agent systems, or any other suitable known techniques or algorithms. Indeed, any other suitable AI-powered speech recognition technology may be employed.

In addition, this speech recognition technology may be performed remotely, locally, or partially remote/local. For example, controller 122 of knife station 100 may be programmed to obtain an audio clip of speech or a textual command, convert that speech into text, and determine based on the text command which knife is appropriate for the situation. According to an alternative embodiment, controller 122 may transmit the raw audio file to a remote server for analysis and may thereafter receive the recommendation from the remote server. Other data communication structures and implementations are possible and within the scope of the present subject matter.

Step 230 may include identifying a target cutlery object from the plurality of cutlery objects based at least in part on the text command. For example, controller 122 may contain an internal database 180, may communicate with an external server (e.g., as identified in FIG. 2 by reference numeral 182), or may otherwise be operably coupled with a database for associating the received text command with a target cutlery object. For example, if the voice command 162 is "slice bread," controller 122 may query database 180 or external server 182, which would return a bread knife as the target cutlery object. If the voice command were "slice tomato," controller 122 might return a 7" Santoku knife as the target cutlery object. It should be appreciated that the target cutlery object may be customizable based on user preference, empirical data, industry standards, manufacturer preferences, etc.

Step 240 includes operating a locking mechanism to unlock the target cutlery object so that the user may remove it from the knife block. For example, after the target cutlery object is determined in steps 210-230, locking assembly 120 may operate locking arm 130, linear actuator 140, or actuating mechanism 152 to release only the target cutlery object from knife block 102. In addition, step 250 may include illuminating the knife block proximate the target cutlery object. In this manner, indicator system 170 may illuminate a light source 172 that is positioned adjacent slot 110 that holds the target cutlery object 104. In this manner, a user 114 is directed to the appropriate cutlery object 104 and may only remove the appropriate cutlery object 104.

It should be appreciated that controller 122 may be further programmed for implementing safety protocols with operation of knife system 100. For example, it may be desirable to prevent users under a certain age from using knife station 100, e.g., to prevent dangerous situations. In this manner, controller 122 may be programmed to recognize an authorized user's voice. In the event an unauthorized user requests a knife or cutlery object 104 from knife block 102, knife station 100 may lock all cutlery objects 104 into knife block 102 and display an error notification. Similarly, controller 122 may be programmed for assessing a user's age, e.g., based on their tone of voice or in any other suitable manner. Other suitable manners for authenticating inappropriate user are possible and within the scope of the present subject matter.

FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using knife station 100 as an example, it should be appreciated that these methods may be applied to the operation of any suitable knife stations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A knife station comprising:
   a knife block defining a plurality of slots;
   a plurality of cutlery objects, each of the plurality of cutlery objects being configured for receipt within one of the plurality of slots;
   a locking assembly for selectively locking one or more of the plurality of cutlery objects within the plurality of slots; and
   a controller operably coupled to the locking assembly, the controller being configured to:
      receive a voice command from a user;
      identify a target cutlery object from the plurality of cutlery objects based at least in part on the voice command; and
      unlock the identified target cutlery object so that the user may remove it from the knife block, wherein remaining cutlery objects of the plurality of cutlery objects remain locked.

2. The knife station of claim 1, wherein identifying the target cutlery object comprises:
   converting the voice command to a text command using a speech recognition technology; and
   determining the target cutlery object based on the text command.

3. The knife station of claim 2, wherein determining the target cutlery object from the text command comprises:
   comparing the text command to a database of text commands to associate the text command with the target cutlery object.

4. The knife station of claim 2, wherein the speech recognition technology comprises an artificial intelligence or machine learning technique to convert the voice command.

5. The knife station of claim 1, wherein the controller is further configured to:
   determine that the voice command is not communicated from an authorized user; and
   operate the locking mechanism to lock each of the plurality of knives if the voice command is not communicated from the authorized user.

6. The knife station of claim 5, wherein determining that the voice command is not communicated from the authorized user comprises authenticating a particular user or detecting a tone of the voice command.

7. The knife station of claim 1, wherein the locking assembly unlocks the target cutlery object while keeping each of the remaining of the plurality of cutlery objects locked in the knife block.

8. The knife station of claim 1, further comprising:
   an indicator system for selectively identifying one or more of the plurality of cutlery objects within the knife block.

9. The knife station of claim 8, wherein the indicator system comprises:
   a plurality of light emitting diodes, each of the plurality of light emitting diodes being associated with one of the plurality of cutlery objects and being selectively illuminated to identify the target cutlery object of the plurality of cutlery objects.

10. The knife station of claim 8, wherein the controller is configured to:
   illuminate the knife block proximate the target cutlery object.

11. The knife station of claim 1, wherein the voice command comprises a type of cut to be made and a food type of food to be cut.

12. The knife station of claim 1, wherein each of the plurality of cutlery objects defines an aperture, and wherein the locking assembly comprises:
   a plurality of linear actuators, each of the plurality of linear actuators comprising a locking pin that selectively extends into the aperture of one of the plurality of knives.

13. The knife station of claim 1, wherein the locking assembly comprises:
   a clamping member operably coupled to an actuator for selectively clamping a blade of one of the plurality of knives.

14. The knife station of claim 1, further comprising:
   an audio input device for receiving the voice command.

15. A method of operating a knife station, the knife station comprising a knife block defining a plurality of slots for receiving a plurality of cutlery objects and a locking assembly for selectively locking one or more of the plurality of cutlery objects within the plurality of slots, the method comprising:
   receiving a voice command from a user;
   identifying a target cutlery object from the plurality of cutlery objects based at least in part on the voice command; and
   unlocking the identified target cutlery object so that the user may remove it from the knife block, wherein remaining cutlery objects of the plurality of cutlery objects remain locked.

16. The method of claim 15, wherein identifying the target cutlery object comprises:
   converting the voice command to a text command using a speech recognition technology; and
   determining the target cutlery object based on the text command.

17. The method of claim 16, wherein the speech recognition technology comprises an artificial intelligence or machine learning technique to convert the voice command.

18. The method of claim 15, further comprising:
   determining that the voice command is not communicated from an authorized user; and
   operating the locking mechanism to lock each of the plurality of knives if the voice command is not communicated from the authorized user.

19. The method of claim 15, wherein the knife station further comprises an indicator system for selectively identifying one or more of the plurality of cutlery objects within the knife block, the method comprising:
   illuminating the knife block proximate the target cutlery object.

20. The method of claim 15, wherein each of the plurality of cutlery objects defines an aperture, and wherein the locking assembly comprises:
   a plurality of linear actuators, each of the plurality of linear actuators comprising a locking pin that selectively extends into the aperture of one of the plurality of knives.

\* \* \* \* \*